(12) United States Patent
Sanchez Rodriguez et al.

(10) Patent No.: US 11,486,575 B2
(45) Date of Patent: Nov. 1, 2022

(54) GAS TAP FOR A GAS COOKING APPLIANCE

(71) Applicant: COPRECI, S.COOP, Aretxabaleta (ES)

(72) Inventors: Jose Octavio Sanchez Rodriguez, Jalisco (MX); Maider Sarriegi Galparsoro, Aretxabaleta (ES)

(73) Assignee: COPRECI, S.COOP., Aretxabaleta (ES)

( * ) Notice: Subject to any disclaimer, the term of this patent is extended or adjusted under 35 U.S.C. 154(b) by 0 days.

(21) Appl. No.: 17/338,174

(22) Filed: Jun. 3, 2021

(65) Prior Publication Data
US 2022/0090785 A1  Mar. 24, 2022

(30) Foreign Application Priority Data

Sep. 23, 2020  (EP) .................................... 20382839

(51) Int. Cl.
*F23N 1/00* (2006.01)
*F16K 5/00* (2006.01)
(Continued)

(52) U.S. Cl.
CPC ............ *F23N 1/007* (2013.01); *F16K 5/0242* (2013.01); *F16K 5/103* (2013.01); *F16K 35/027* (2013.01); *F23N 2235/24* (2020.01)

(58) Field of Classification Search
CPC ...... F16K 35/027; F16K 5/0242; F16K 5/103; F23N 1/007; F23N 2235/24; F23N 5/247; F23K 2900/05002
See application file for complete search history.

(56) References Cited

U.S. PATENT DOCUMENTS 1,917,981 A * 7/1933 Kindl .................... F16K 35/027
                                                        251/95
2,064,623 A   12/1936 Mueller
(Continued)

FOREIGN PATENT DOCUMENTS

EP   2738433 A1   6/2014
GB    682095 A   11/1952
GB   1280371 A    7/1972

OTHER PUBLICATIONS

European Search Report received in EP application No. 2738433, dated Mar. 7, 2014 (3 pages).

*Primary Examiner* — Kelsey E Cary
(74) *Attorney, Agent, or Firm* — Edell, Shapiro & Finnan, LLC

(57) ABSTRACT

According to one embodiment a gas tap is provided that includes a manually operable shaft having a first end coupled to a regulating element and a second end configured to be coupled to a knob that can be operated by a user. The shaft includes a first locking element, and the gas tap includes a second locking element. The shaft is rotational between an initial angular position and a final angular position, and is axially movable when it is arranged in the initial angular position between a first axial position in which the first locking element and the second locking element cooperate with one another, preventing the shaft from being able to rotate, and a second axial position in which the shaft is able to rotate. The user has to pull on the shaft in order to move it from the first axial position to the second axial position.

13 Claims, 11 Drawing Sheets

(51) Int. Cl.
*F16K 35/02* (2006.01)
*F16K 5/02* (2006.01)
*F16K 5/10* (2006.01)

(56) References Cited

U.S. PATENT DOCUMENTS

| | | |
|---|---|---|
| 2,194,714 A | 3/1940 | Mueller |
| 2014/0151591 A1* | 6/2014 | Gerenabarrena Meabebasterretxea ...................... F16K 35/027 251/227 |
| 2018/0231141 A1* | 8/2018 | Feng .................... F16K 35/027 |

* cited by examiner

GAS TAP FOR A GAS COOKING APPLIANCE

CROSS-REFERENCE TO RELATED APPLICATIONS

This application relates to and claims the benefit and priority to European Application No. EP20382839.7, filed Sep. 23, 2020.

TECHNICAL FIELD

The present invention relates to gas taps for a gas cooking appliance, and to gas cooking appliances incorporating the gas taps.

BACKGROUND

Gas taps in which it is necessary to perform two movements to enable opening the gas passage, such that when they are arranged in the initial angular position in which the gas passage is closed, the shaft must be pushed before being able to turn it to open the gas passage, are known. For example, EP2738433A1 describes a gas tap of this type.

SUMMARY

A first aspect of the invention relates to a gas tap for a gas cooking appliance.

The gas tap comprises a body comprising an inlet conduit through which the gas is supplied, at least one gas outlet conduit, and a housing fluidically communicated with the inlet conduit and with the outlet conduit. The gas tap also comprises a regulating element arranged in the housing of the body and suitable for regulating the incoming gas flow from the inlet conduit towards the outlet conduit depending on its angular position.

The gas tap further comprises a manually operable shaft. The shaft comprises a first end coupled to the regulating element and a second end configured for being coupled to a knob that can be operated by a user. The shaft also comprises a first locking element. The shaft is rotational between an initial angular position and a final angular position.

The gas tap comprises a second locking element arranged in the initial angular position.

The shaft is axially movable when it is arranged in the initial angular position between a first axial position in which the first locking element and the second locking element cooperate with one another, preventing the shaft from being able to rotate, and a second axial position in which the first locking element is uncoupled from the second locking element such that the shaft is able to rotate.

The gas tap comprises pushing means configured for pushing the shaft towards the first axial position.

The second end of the shaft is located further away from the body when the shaft is arranged in the second axial position than when the shaft is arranged in the first axial position, such that the user has to pull on the shaft in order to move it from the first axial position to the second axial position.

Unlike the known gas taps, when the gas tap of the invention is arranged in the initial angular position in which the gas passage is closed, it is necessary to pull on the shaft before it can be rotated in order to open the gas passage. The initial movement of pushing the shaft is therefore replaced with the initial movement of pulling on the shaft. Gas taps of the state of the art have the drawback that the gas passage may accidentally open if a user rests against them. The gas tap of the invention thereby offers a safer solution in a simple manner.

A second aspect of the invention relates to a gas cooking appliance comprising at least one gas tap such as the one described in the first aspect of the invention.

These and other advantages and features will become apparent in view of the figures and the detailed description.

DETAILED DESCRIPTION

Figure 1:
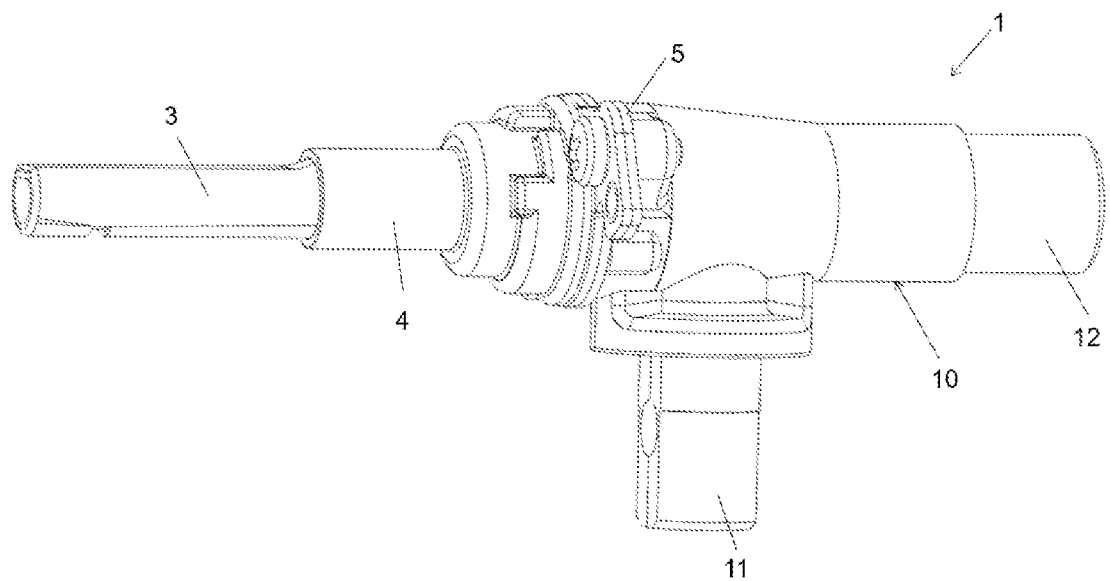
FIG. 1 shows a perspective view of a first embodiment of a gas tap.
Figure 2:
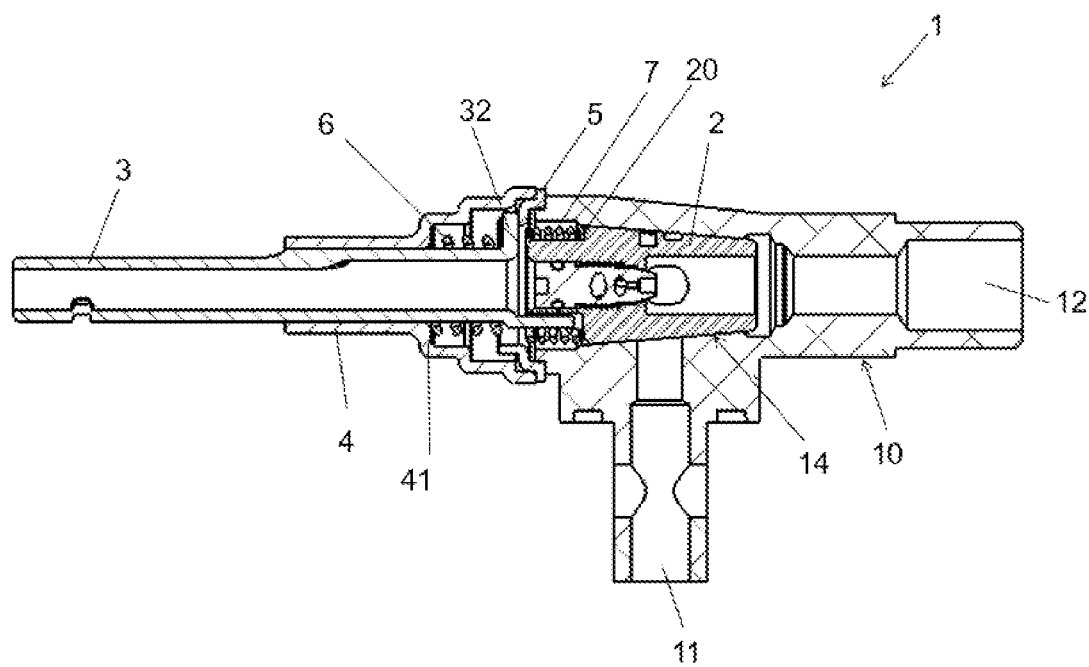
FIG. 2 shows a section view of the gas tap of FIG. 1.

A first aspect relates to a gas tap 1 for a gas cooking appliance.

The gas tap 1 comprises a body 10 comprising an inlet conduit 11 through which the gas is supplied and configured for being coupled to a gas supply tube (not shown in the figures), at least one gas outlet conduit 12, 13 configured for being connected by means of a gas conduit to a burner or a corresponding burner holder (not shown in the figures), and a housing 14 fluidically communicated with the inlet conduit 11 and with the at least one outlet conduit 12, 13.

The gas tap 1 also comprises a regulating element 2 arranged in the housing 14 of the body 10 and suitable for regulating the incoming gas flow from the inlet conduit 11 towards the outlet conduit 12, 13 depending on its angular position. The regulating element 2 is preferably an element having a hollow frustoconical geometry arranged in a fitted manner in the housing 14 of the body 10 of the gas tap 1, being able to rotate with respect to the body 10. The regulating element may alternatively be of any other type known to one skilled in the art.

The gas tap 1 further comprises a manually operable shaft 3 comprising a first end 30 coupled to the regulating element 2 such that both parts rotate integrally with one another. The first end 30 of the shaft 3 preferably comprises an arm 33 which is axially prolonged and housed in a corresponding housing of the regulating element 2 for coupling the shaft 3 to the regulating element 2. The gas tap 1 also comprises a second end 31 configured for being coupled to a knob that can be operated by a user such that both parts move in an integral manner. The shaft 3 is rotational in the counter-clockwise direction from an initial angular position in which the gas passage is closed to a final angular position, and in the clockwise direction from the final angular position to the initial angular position, such that the user may vary the gas flow rate directed to a corresponding burner or burner holder depending on the angular position of the knob and therefore of the shaft 3. The shaft 3 is also axially movable when it is arranged in the initial angular position between a first axial position and a second axial position.

The shaft 3 comprises a first locking element 32, the gas tap 1 comprising a second locking element 50 which is arranged in the initial angular position and configured for cooperating with the first locking element 32 of the shaft 3 when the shaft 3 is arranged in the initial angular position and in the first axial position, such that when the first locking element 32 and the locking element 50 cooperate with one another, the shaft 3 is unable to rotate. When the shaft 3 is arranged in the initial angular position and in the second axial position, the first locking element 32 does not cooperate with the second locking element 50, such that the shaft 3 is able to rotate.

To enable moving the shaft 3 from the first axial position to the second axial position, the user has to pull on the shaft 3 towards himself/herself, i.e., the second end 31 of the shaft 3 is located further away from the body 10 when the shaft 3 is arranged in the second axial position than when the shaft 3 is arranged in the first axial position.

Two movements are therefore necessary to enable opening the gas passage; first the shaft must be moved from the first axial position to the second axial position by pulling on same, to then enable rotating the shaft and adjusting the required gas flow rate.

The gas tap 1 comprises pushing means configured for pushing the shaft 3 towards the first axial position. The pushing means therefore ensure that, provided that the shaft 3 is arranged in the initial angular position and there is no external force acting on the shaft 3, the latter will be arranged in the first axial position.

Preferably the first locking element 32 is a radial prolongation of the shaft 3 and the second locking element 50 is a housing arranged in the initial angular position, such that when the shaft 3 is arranged in the initial angular position and in the first axial position, the first locking element 32 is housed in the second locking element 50 such that the shaft 3 is unable to rotate, the first locking element 32 being dislodged from the second locking element 50 when it is arranged in the second axial position. The first locking element and the second locking element may alternatively have other shapes, for example the first locking element may be a groove arranged in the shaft and the second locking element may be a protrusion of the gas tap.

The first locking element 32 is preferably arranged at the first end 30 of the shaft, preferably being a projection which is prolonged radially from the first end 30.

Preferably, when the second locking element 50 is a housing arranged in the initial angular position, the gas tap 1 also comprises a supporting surface 51 after the second locking element 50, the first locking element 32 being supported on the supporting surface 51 when the shaft 3 is arranged between the initial angular position and the final angular position. Therefore, the second locking element 50 is arranged in the first axial position and the supporting surface 51 is arranged in the second axial position.

The gas tap 1 preferably comprises a cover 4 fixed to the body 10 covering the housing 14 of the body 10, the cover 4 comprising a guide surface 40 configured for guiding the rotation of the first locking element 32 between the initial angular position and a final angular position. The guide surface is preferably arranged facing the supporting surface 51, the supporting surface 51 and the guide surface 40 forming a channel for guiding the locking element 32 in the rotation of the shaft 3 between the initial angular position and the final angular position.

The pushing means preferably comprise a spring 6 housed in the cover 4, a first end of the spring 6 being supported on a supporting surface 41 of the cover 4 and a second end of the spring supported on the upper surface of the base 35 of shaft 3 which is arranged at the first end 30 thereof. The spring 6 and the shaft 3 are preferably arranged concentric to one another. Furthermore, the gas tap 1 preferably comprises an auxiliary spring 7 comprising a first end supported on the lower surface of the base 35 and a second end supported on a supporting surface 20 of the regulating element 2. The auxiliary spring 7 presses against the regulating element 2 ensuring that it is arranged in a fitted manner in the housing 14 of the body 10. The pressure exerted by the auxiliary spring 7 on the shaft 3 is opposite the pressure exerted on the shaft 3 by the spring 6 of the pushing means, so for the correct operation of the gas tap 1 it must be ensured that the pressure exerted by the spring 6 of the pushing means is greater than the pressure exerted by the auxiliary spring 7.

The gas tap 1 preferably comprises a base 5 with a first part housed in the cover 4, the first part of the base 5 defining at least part of the second locking element 50, the base 5 comprising a second part 52 coupled to the body 10 of the gas tap 1. The first locking element 50 could alternatively be defined by the actual body 10 of the gas tap 1.

The shaft 3 preferably comprises a housing 34 in the proximity of the second end 31, the housing 34 being configured for receiving a fixing element for fixing the operable knob which is coupled to the second end 31, such that the knob is kept coupled to the shaft 3 when the user pulls the knob towards himself/herself to move the shaft 3 from the first axial position to the second axial position. The fixing element of the knob is preferably a stud or a pin configured for being housed in the housing 34 of the shaft 3. The shaft may alternatively have another type of coupling means for ensuring that the shaft 3 and the knob are kept coupled together when the user pulls the knob towards himself/herself to enable moving the shaft 3 from the first axial position to the second axial position.

FIGS. 1 to 8 show a first embodiment of the gas tap 1.

In this first embodiment, the gas tap 1 comprises a body 10 comprising an inlet conduit 11 through which the gas is supplied, a gas outlet conduit 12, and a housing 14 fluidically communicated with the inlet conduit 11 and with the outlet conduit 12. The gas tap 1 also comprises a regulating element 2 having a hollow frustoconical geometry arranged in a fitted manner in the housing 14 of the body 10, being able to rotate with respect to the body 10 so as to regulate the incoming gas flow from the inlet conduit 11 towards the outlet conduit 12 depending on its angular position. In other possible embodiments, the regulating element 2 may be of any other type known to one skilled in the art.

Figure 3:
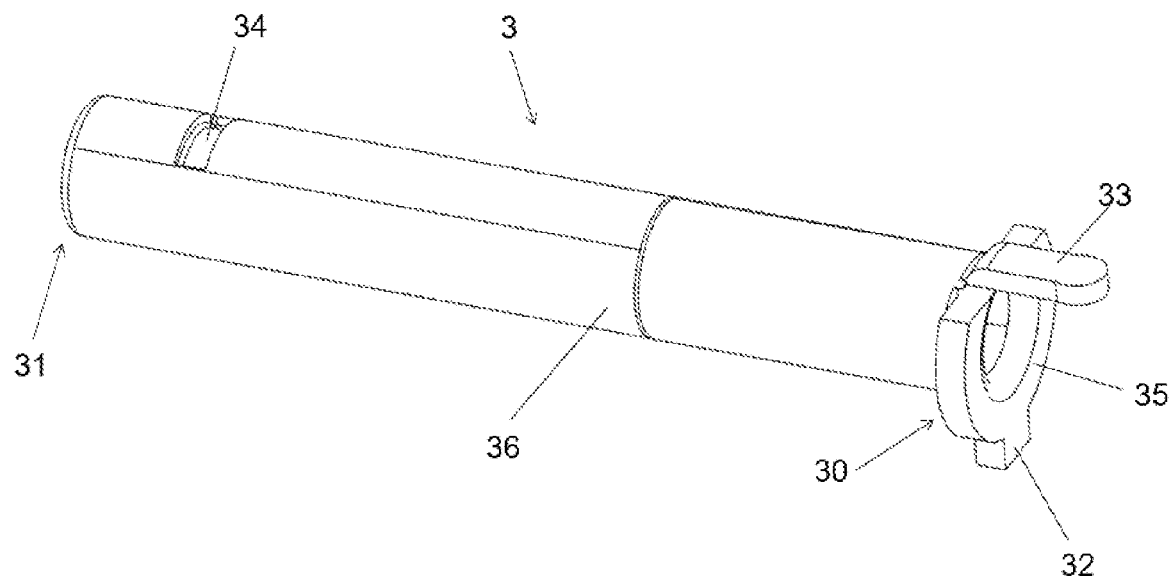
FIG. 3 shows a perspective view of the shaft of the gas tap of FIG. 1.
Figure 4:
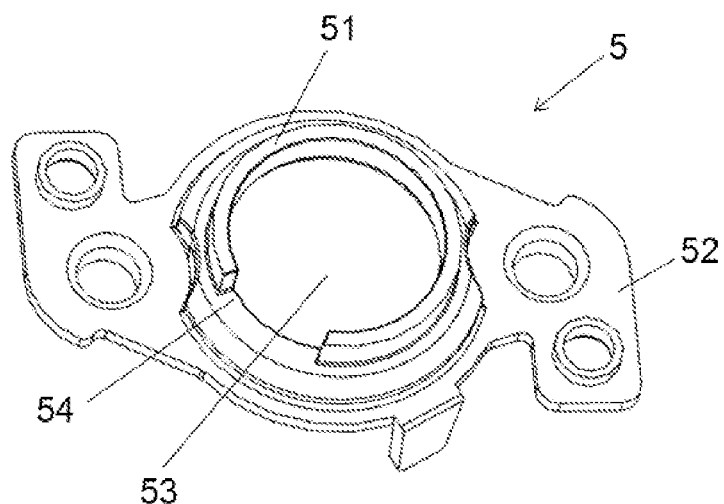
FIG. 4 shows a perspective view of the base of the gas tap of FIG. 1.
Figure 5:
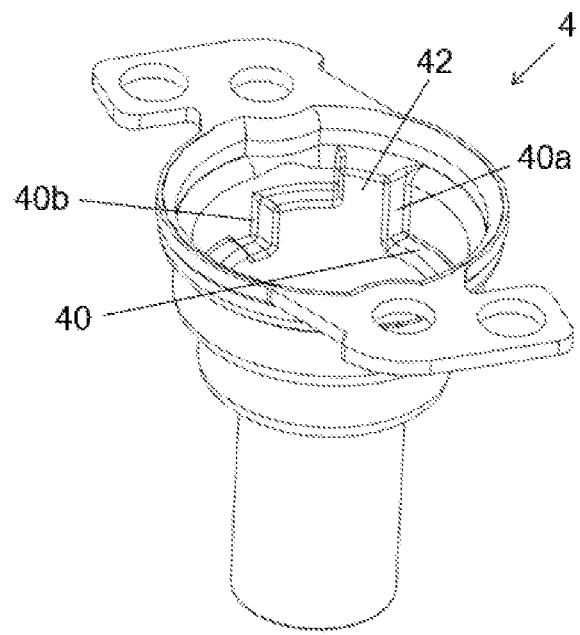
FIG. 5 shows a perspective view of the cover of the gas tap of FIG. 1.

In this first embodiment, the gas tap 1 also comprises a manually operable shaft 3, shown in detail in FIG. 3. The shaft 3 comprises a first end 30 coupled to the regulating element 2 such that both parts rotate integrally with one another. The gas tap 1 also comprises a second end 31 configured for being coupled to a knob that can be operated by a user such that both parts move in an integral manner.

The shaft 3 is rotational between an initial angular position in which the gas passage is closed and a final angular position, such that the user may vary the gas flow rate directed to a corresponding burner depending on the angular position of the knob and therefore of the shaft 3. The shaft 3 is also axially movable when it is arranged in the initial angular position between a first axial position and a second axial position.

In this first embodiment, the shaft 3 comprises a tubular body 36 and a semicircular base 35 which is prolonged radially from an end of the body 36, the base 35 being arranged at the first end 30 of shaft 3. The shaft 3 comprises an arm 33 which is axially prolonged from the base 35 and housed in a corresponding housing of the regulating element 2 for coupling the shaft 3 to the regulating element 2. The shaft 3 also comprises a first locking element 32 extending radially from the base 35.

The gas tap 1 comprises a second locking element 50 which is arranged in the initial angular position and configured for cooperating with the first locking element 32 of the shaft 3 when the shaft 3 is arranged in the initial angular position and in the first axial position. When the first locking element 32 and the second locking element 50 cooperate with one another, the shaft 3 is unable to rotate. In this first embodiment, the second locking element 50 is a housing arranged in the initial angular position. Therefore, when the shaft 3 is arranged in the initial angular position and in the first axial position, the first locking element 32 is housed in the second locking element 50, preventing the shaft 3 from being able to rotate. However when the shaft 3 is arranged in the initial angular position and in the second axial position, the first locking element 32 is dislodged from the second locking element 50 such that the shaft 3 is able to rotate.

To enable moving the shaft 3 from the first axial position to the second axial position, the user has to pull the shaft 3 towards himself/herself, i.e., the second end 31 of the shaft 3 is located further away from the body 10 when the shaft 3 is arranged in the second axial position than when the shaft 3 is arranged in the first axial position. Therefore, as discussed above, two movements are necessary to enable opening the gas passage, first the shaft must be moved from the first axial position to the second axial position by pulling on same, to then enable rotating the shaft and adjusting the required gas flow rate.

In this first embodiment, to ensure that the knob is kept coupled to the shaft 3 when the user pulls on the knob towards himself/herself to move the shaft 3 from the first axial position to the second axial position, the shaft 3 comprises a housing 34 in the proximity of the second end 31, the housing 34 being configured for receiving a fixing element for fixing the operable knob which is coupled to the second end 31.

The gas tap 1 also comprises pushing means configured for pushing the shaft 3 towards the first axial position. Therefore the pushing means ensure that, provided that the shaft 3 is arranged in the initial angular position and there is no external force acting on the shaft 3, the latter will be arranged in the first axial position. In this first embodiment, the pushing means are a spring 6. In other possible embodiments, the pushing means may be of any other type known to one skilled in the art.

Figure 6:
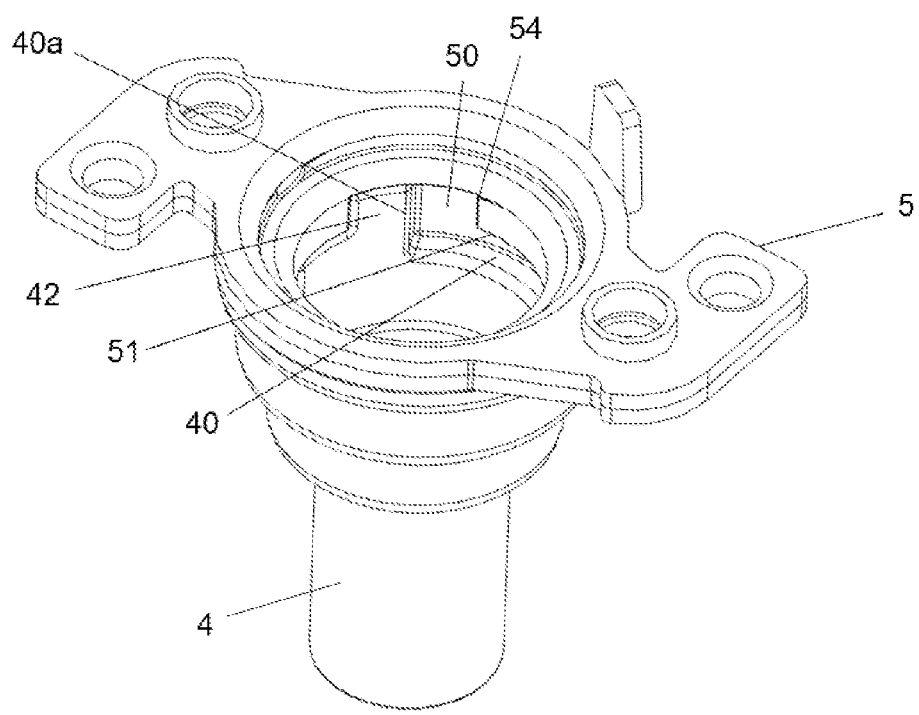
FIG. 6 shows a perspective view of the base and the cover of the gas tap of FIG. 1.
Figure 7:
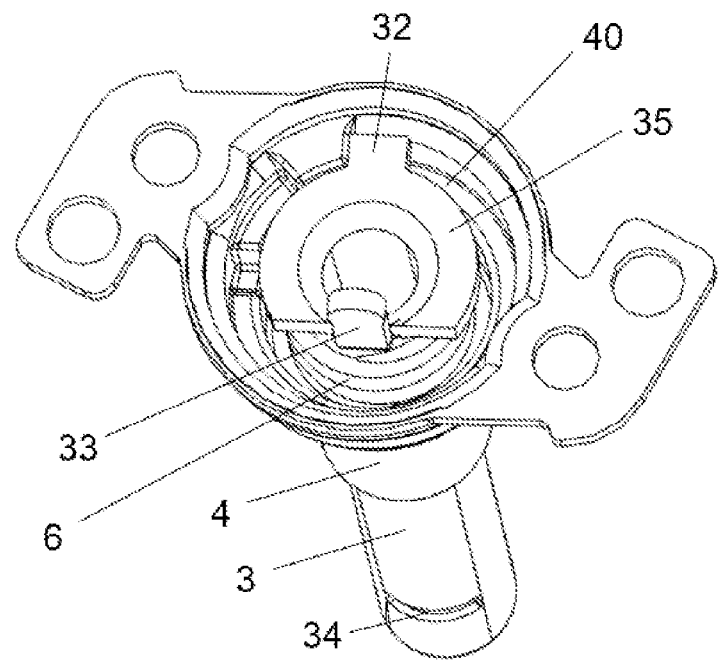
FIG. 7 shows a partial view of the gas tap of FIG. 1.
Figure 8:
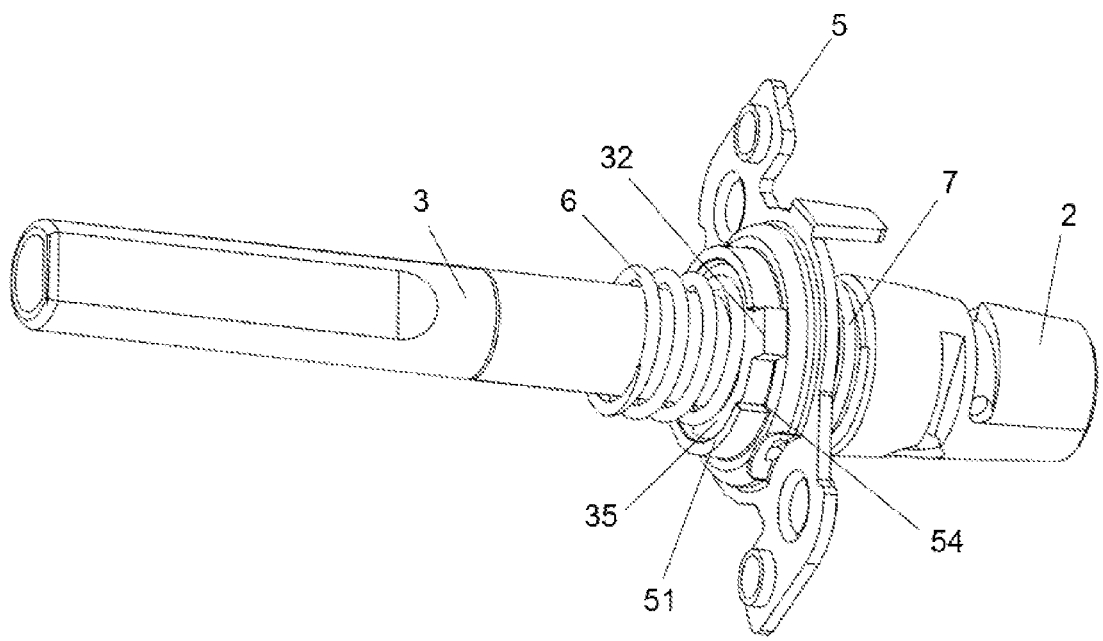
FIG. 8 shows a second partial view of the gas tap of FIG. 1.
Figure 9:
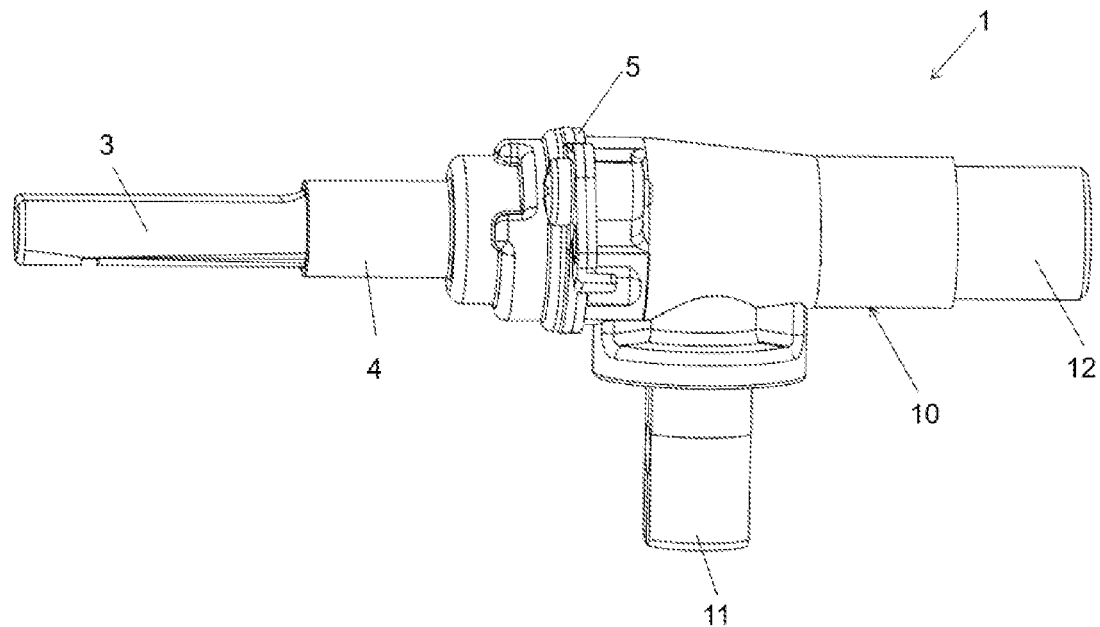
FIG. 9 shows a perspective view of a second embodiment of the gas tap.
Figure 10:
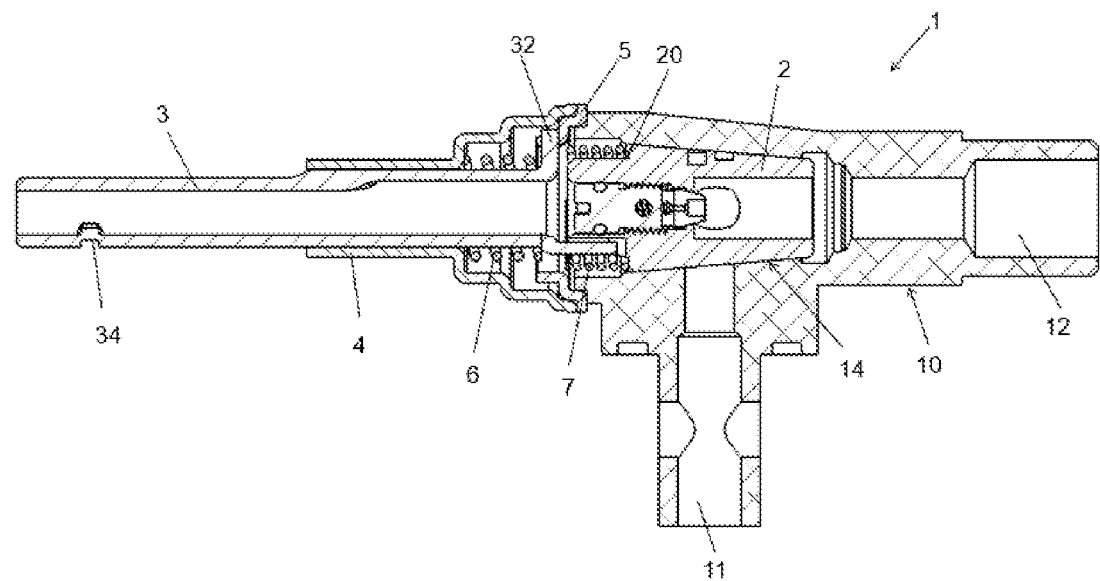
FIG. 10 shows a section view of the gas tap of FIG. 9.

In this first embodiment, the gas tap 1 also comprises a cover 4 fixed to the body 10 covering the housing 14 of the body 10, and a base 5 is arranged between the body 10 and the cover 4. The base 5, shown in detail in FIG. 4, comprises a first part housed in the cover 4 and a second part 52 coupled to the body 10. The first part of the base 5 comprises a notch 54. The cover 4, shown in detail in FIG. 5, comprises an axial stop element 42 partially housed in the notch 54 of the base 5, part of the notch 54 of the base 5 and part of the axial stop element 42 defining the second locking element 50, as shown in FIG. 6. This configuration of the base 5 and the cover 4 allows for a higher tolerance margin, conserving assembly precision.

In this first embodiment, the base 5 comprises a supporting surface 51 after the notch 54, the first locking element 32 being supported on the supporting surface 51 when the shaft 3 is arranged between the initial angular position and the final angular position. The cover 4 further comprises a guide surface 40 configured for guiding the rotation of the first locking element 32 between the initial angular position and the final angular position. Therefore, the supporting surface 51 of the base 5 and the guide surface 40 of the cover form a channel guiding the rotation of the locking element 32 of the shaft 3 between the initial angular position and the final angular position.

In this first embodiment, the cover 5 further comprises an initial stop surface 40a and a final stop surface 40b such that it limits the angular travel of the shaft 3. That is, when the first stop element 32 is arranged in the second axial position and in the initial angular position, it abuts with the initial stop surface 40a such that it prevents the shaft 3 from rotating in the clockwise direction, whereas when the first stop element 32 is arranged in the second axial position and in the final angular position, it abuts with the final stop surface 40b such that it prevents the shaft 3 from rotating in the counterclockwise direction. In this first embodiment, the initial stop surface 40a is one of the axial surfaces of the axial stop element 42.

In this first embodiment, the spring 6 of the pushing means is arranged housed in the cover 4, a first end of the spring 6 being supported on a supporting surface 41 of the cover 4 and a second end of the spring supported on the upper surface of the base 35 of the shaft 3.

In this first embodiment, the gas tap 1 comprises an auxiliary spring 7 comprising a first end supported on the lower surface of the base 35 and a second end supported on a supporting surface 20 of the regulating element 2. The auxiliary spring 7 presses against the regulating element 2 ensuring that it is arranged in a fitted manner in the housing 14 of the body 10. The pressure exerted by the auxiliary spring 7 on the shaft 3 is opposite the pressure exerted on the shaft 3 by the spring 6 of the pushing means, so for the correct operation of the gas tap 1 it must be ensured that the pressure exerted by the spring 6 of the pushing means is greater than the pressure exerted by the auxiliary spring 7.

FIGS. 9 to 15 show a second embodiment of the gas tap 1.

Figure 11:
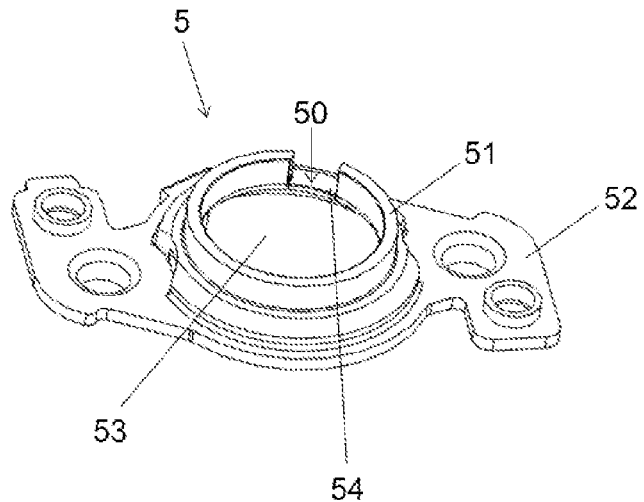
FIG. 11 shows a perspective view of the base of the gas tap of FIG. 9.
Figure 12:
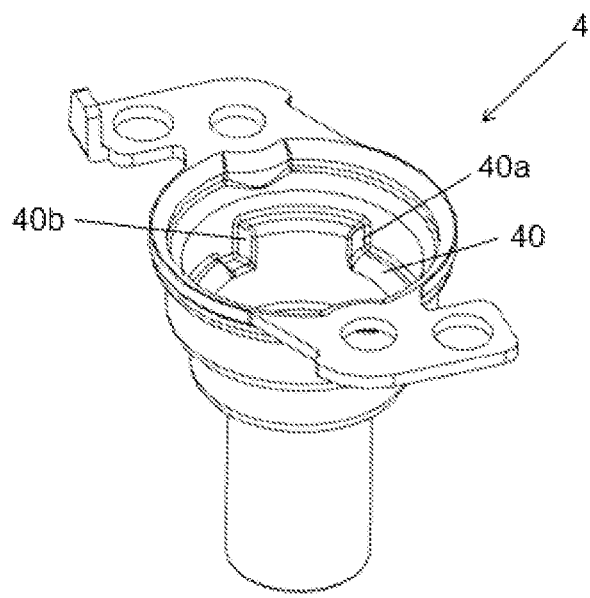
FIG. 12 shows a perspective view of the cover of the gas tap of FIG. 9.
Figure 13:
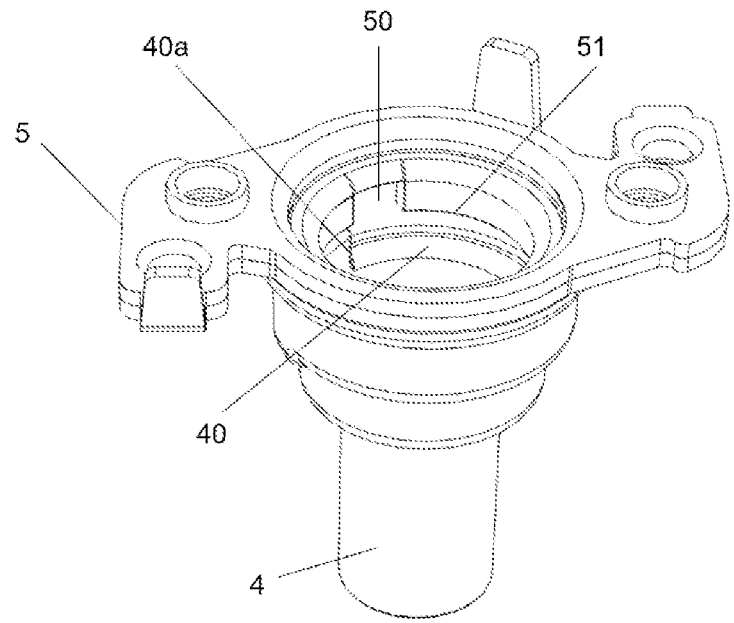
FIG. 13 shows a perspective view of the base and the cover of the gas tap of FIG. 9.
Figure 14:
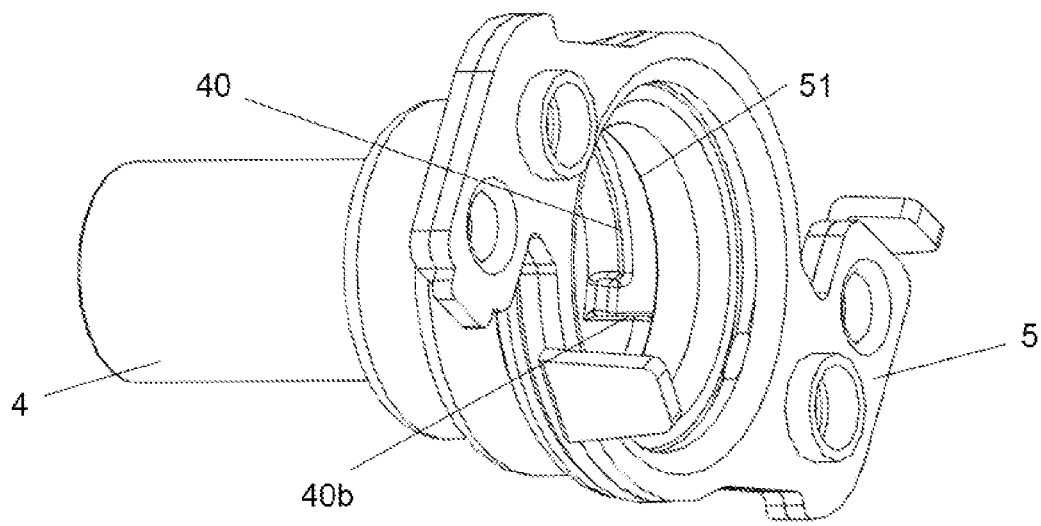
FIG. 14 shows a second perspective view of the base and the cover of the gas tap of FIG. 9.
Figure 15:
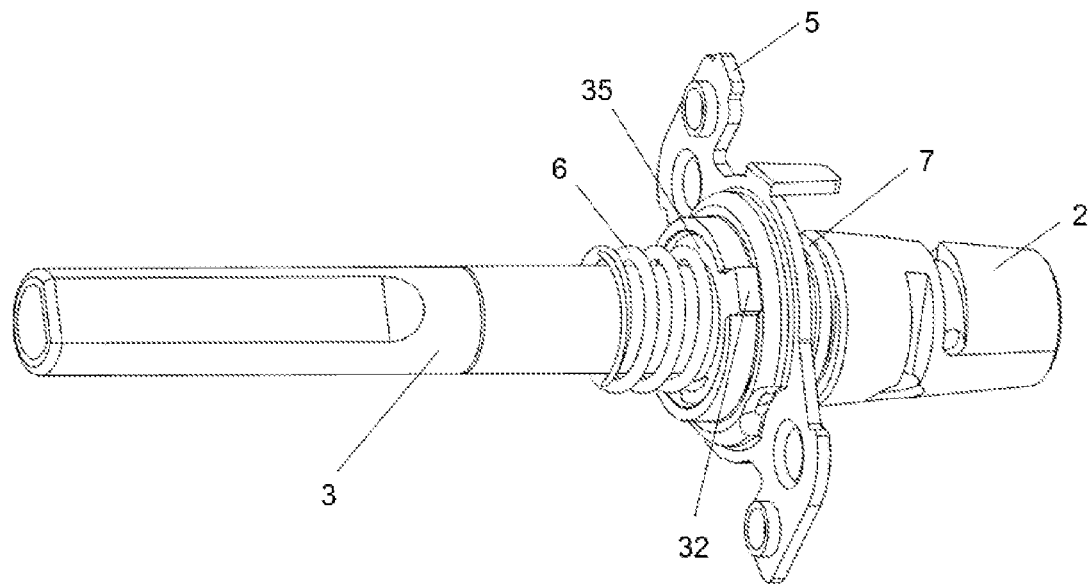
FIG. 15 shows a partial view of the gas tap of FIG. 9.
Figure 16:
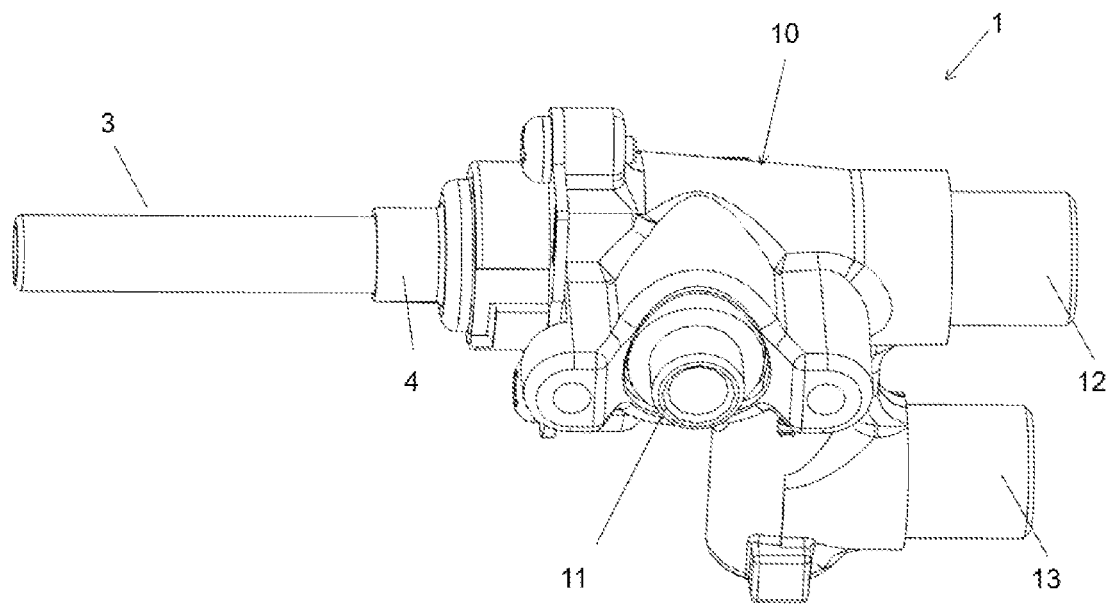
FIG. 16 shows a perspective view of a third embodiment of the gas tap.
Figure 17:
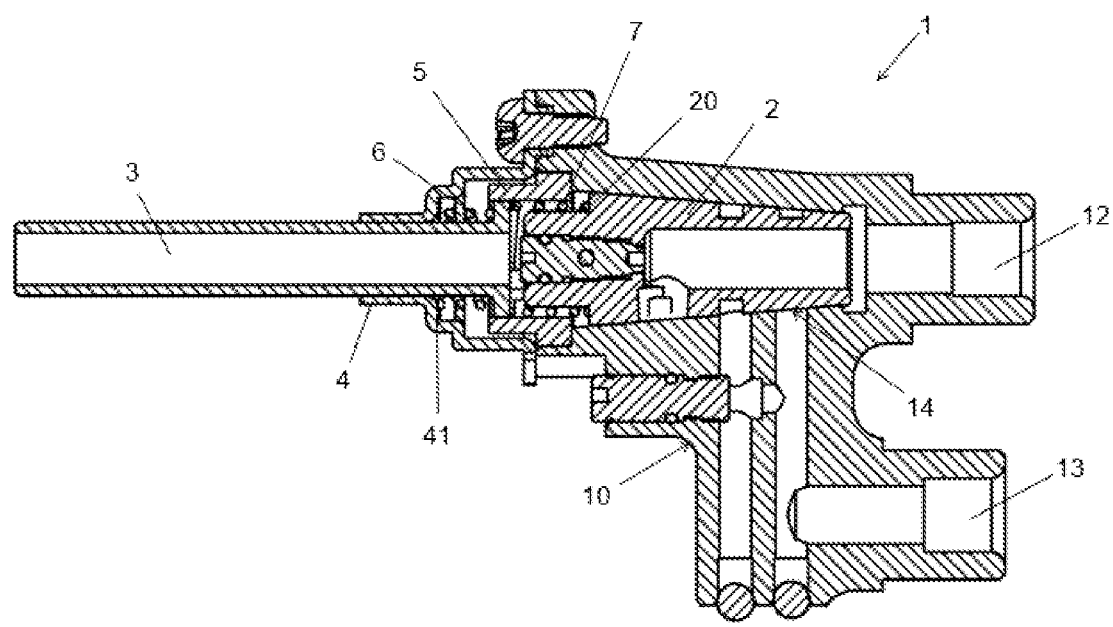
FIG. 17 shows a section view of the gas tap of FIG. 16.

This second embodiment differs from the first embodiment in the configuration of the second locking element 50 since in this case, the second locking element 50 is limited only by the notch 54 of the base 5, as seen in FIGS. 11 and 13. The rest of the features are similar to those of the first embodiment, so it is not considered necessary to describe them again.

FIGS. 15 to 21 show a third embodiment of the gas tap 1.

In this third embodiment, the gas tap 1 is a dual gas tap suitable for supplying dual burners. The gas tap 1 comprises a body 10 comprising an inlet conduit 11 through which the gas is supplied, a first gas outlet conduit 12, a second gas outlet conduit 13, and a housing 14 fluidically communicated with the inlet conduit 11 and with the first and second outlet conduits 12 and 13. The gas tap 1 also comprises a regulating element 2 having a hollow frustoconical geometry arranged in a fitted manner in the housing 14 of the body 10, being able to rotate with respect to the body 10 so as to regulate the incoming gas flow from the inlet conduit 11 towards the first outlet conduit 12 and towards the second outlet conduit 13 depending on its angular position. In other possible embodiments, the regulating element 2 may be of any other type known to one skilled in the art.

Figure 18:
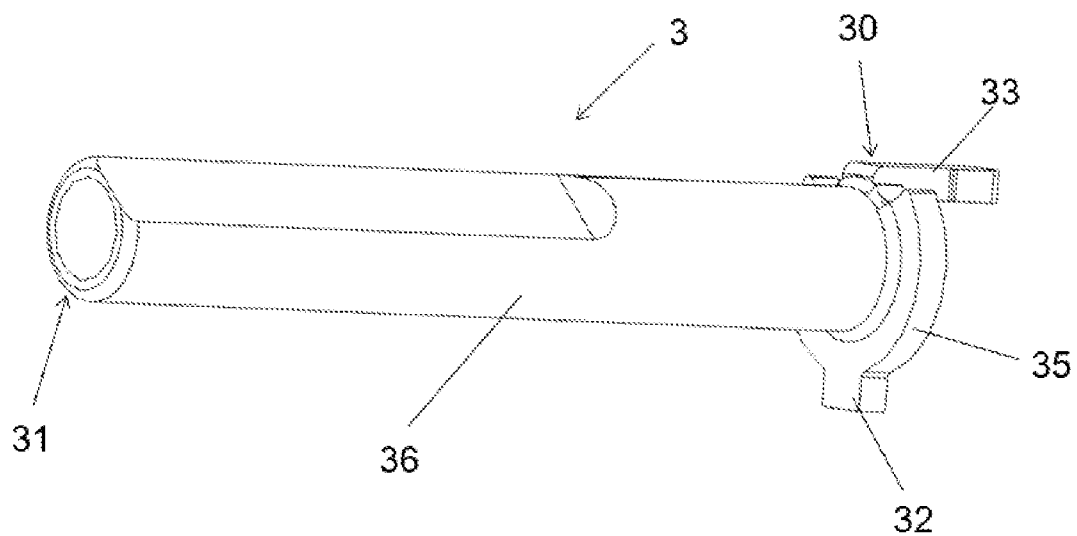
FIG. 18 shows a perspective view of the shaft of the gas tap of FIG. 16.
Figure 19:
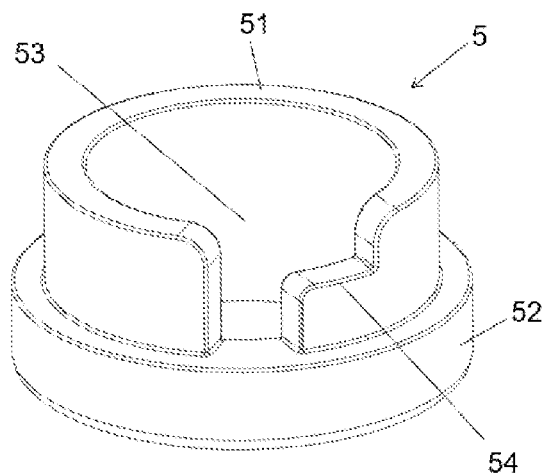
FIG. 19 shows a perspective view of the base of the gas tap of FIG. 16.
Figure 20:
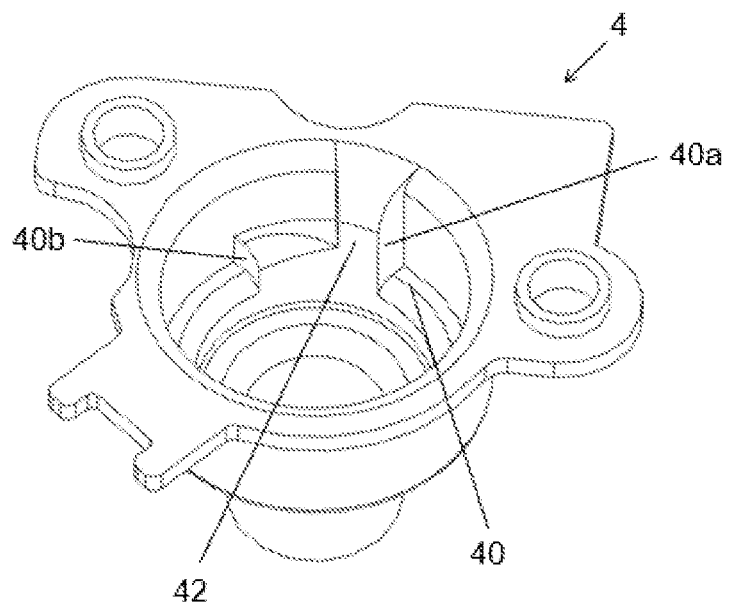
FIG. 20 shows a perspective view of the cover of the gas tap of FIG. 16.

In this third embodiment, the gas tap 1 also comprises a manually operable shaft 3, shown in detail in FIG. 18. The shaft 3 comprises a first end 30 coupled to the regulating element 2 such that both parts rotate integrally with one another. The gas tap 1 also comprises a second end 31 configured for being coupled to a knob that can be operated by a user such that both parts move in an integral manner.

The shaft 3 is rotational between an initial angular position in which the gas passage is closed and a final angular position, such that the user may vary the gas flow rate directed to a corresponding burning depending on the angular position of the knob and therefore of the shaft 3. The shaft 3 is also axially movable when it is arranged in the initial angular position between a first axial position and a second axial position.

In this third embodiment, the shaft 3 comprises a tubular body 36 and a semicircular base 35 is prolonged radially from an end of the body 36, the base 35 being arranged at the first end 30 of shaft 3. The shaft 3 comprises an arm 33 which is axially prolonged from the base 35 and housed in a corresponding housing of the regulating element 2 for coupling the shaft 3 to the regulating element 2. The shaft 3 also comprises a first locking element 32 extending radially from the base 35.

The gas tap 1 comprises a second locking element 50 which is arranged in the initial angular position and configured for cooperating with the first locking element 32 of the shaft 3 when the shaft 3 is arranged in the initial angular position and in the first axial position such that when the first locking element 32 and the locking element 50 cooperate with one another, the shaft 3 is unable to rotate. In this third embodiment, the second locking element 50 is a housing arranged in the initial angular position. Therefore, when the shaft 3 is arranged in the initial angular position and in the first axial position, the first locking element 32 is housed in the second locking element 50, preventing the shaft 3 from being able to rotate. However when the shaft 3 is arranged in the initial angular position and in the second axial position, the first locking element 32 is dislodged from the second locking element 50 such that the shaft 3 is able to rotate.

To enable moving the shaft 3 from the first axial position to the second axial position, the user has to pull the shaft 3 towards himself/herself, i.e., the second end 31 of the shaft 3 is located further away from the body 10 when the shaft 3 is arranged in the second axial position than when the shaft 3 is arranged in the first axial position. Therefore, as discussed above, two movements are necessary to enable opening the gas passage, first the shaft must be moved 3 from the first axial position to the second axial position by pulling on same, to then enable rotating the shaft 3 and adjusting the required gas flow rate.

The gas tap 1 comprises pushing means configured for pushing the shaft 3 towards the first axial position. Therefore the pushing means ensure that, provided that the shaft 3 is arranged in the initial angular position and there is no external force acting on the shaft 3, the latter will be arranged in the first axial position. In this third embodiment, the pushing means are a spring 6. In other possible embodiments, the pushing means may be of any other type known to one skilled in the art.

Figure 21:
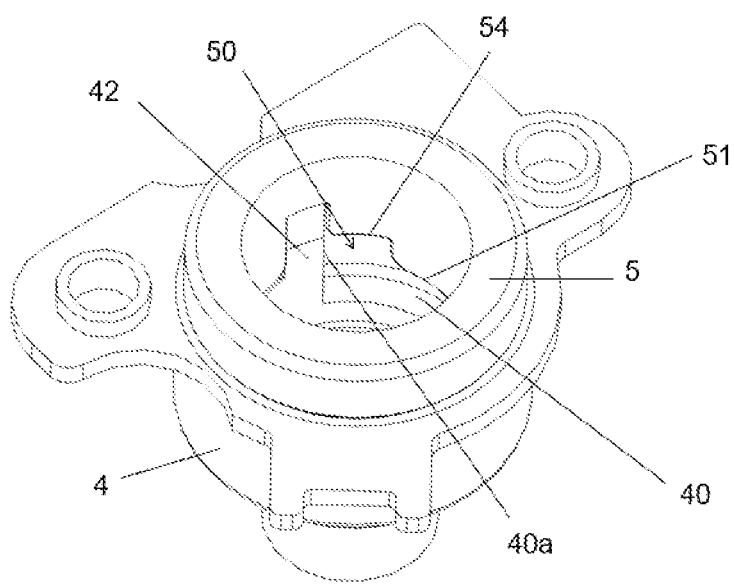
FIG. 21 shows a section view of the base and the cover of the gas tap of FIG. 16.
Figure 22:
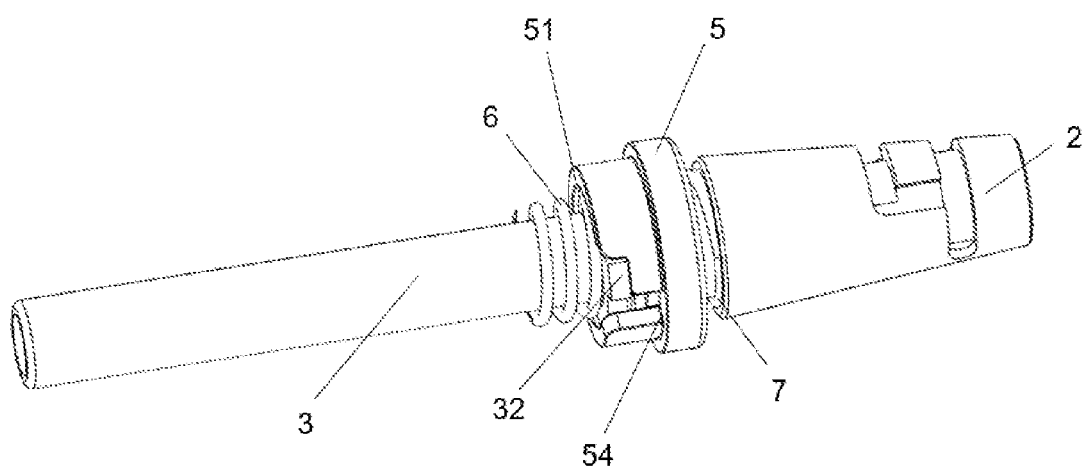
FIG. 22 shows a partial view of the gas tap of FIG. 16.

In this third embodiment, the gas tap 1 also comprises a cover 4 fixed to the body 10 covering the housing 14 of the body 10, and a base 5 is arranged between the body 10 and the cover 4. The base 5, shown in detail in FIG. 19, comprises a first part housed in the cover 4 and a second part 52 housed in the body 10. The first part of the base 5 comprises a stepped notch 54. The cover 4, shown in detail in FIG. 20, comprises an axial stop element 42 partially housed in the notch 54 of the base 5, part of the notch 54 of the base 5 and part of the axial stop element 42 defining the second locking element 50, as shown in FIG. 21. This configuration of the base 5 and the cover 4 allows for a higher tolerance margin, conserving assembly precision.

In this third embodiment, the base 5 comprises a supporting surface 51 after the notch 54, the first locking element 32 being supported on the supporting surface 51 when the shaft 3 is arranged between the initial angular position and the final angular position. The cover 4 further comprises a guide surface 40 configured for guiding the rotation of the first locking element 32 between the initial angular position and the final angular position. Therefore, the supporting surface 51 of the base 5 and the guide surface 40 of the cover 4 form a channel guiding the rotation of the locking element 32 of the shaft 3 between the initial angular position and the final angular position.

In this third embodiment, the cover 5 further comprises an initial stop surface 40a and a final stop surface 40b such that it limits the angular travel of the shaft 3. That is, when the first stop element 32 is arranged in the second axial position and in the initial angular position, it abuts with the initial stop surface 40a such that it prevents the shaft 3 from rotating in the clockwise direction, whereas when the first stop element 32 is arranged in the second axial position and in the final angular position, it abuts with the final stop surface 40b such that it prevents the shaft 3 from rotating in the counterclockwise direction. In this third embodiment, the initial stop surface 40a is one of the axial surfaces of the axial stop element 42.

In this third embodiment, the spring 6 of the pushing means is arranged housed in the cover 4, a first end of the spring 6 being supported on a supporting surface 41 of the cover 4 and a second end of the spring supported on the upper surface of the base 35 of the shaft 3.

In this third embodiment, the gas tap 1 comprises an auxiliary spring 7 comprising a first end supported on the lower surface of the base 35 and a second end supported on a supporting surface 20 of the regulating element 2. The auxiliary spring 7 presses against the regulating element 2 ensuring that it is arranged in a fitted manner in the housing 14 of the body 10. The pressure exerted by the auxiliary spring 7 on the shaft 3 is opposite the pressure exerted on the shaft 3 by the spring 6 of the pushing means, so for the correct operation of the gas tap 1 it must be ensured that the pressure exerted by the spring 6 of the pushing means is greater than the pressure exerted by the auxiliary spring 7.

The shaft 3 of this third embodiment may comprise a housing 34 (not shown in the figures) in the proximity of the second end 31, the housing 34 being configured for receiving a fixing element for fixing the operable knob which is coupled to the second end 31, such that the knob is kept coupled to the shaft 3 when the user pulls the knob towards himself/herself to move the shaft 3 from the first axial position to the second axial position. The fixing element of the knob is preferably a stud or a pin configured for being housed in the housing 34 of the shaft 3. The shaft may alternatively have another type of coupling means for ensuring that the shaft 3 and the knob are kept coupled together when the user pulls the knob towards himself/herself to enable moving the shaft 3 from the first axial position to the second axial position.

A second aspect of the invention relates to a gas cooking appliance comprising at least one gas tap 1 as described in the first aspect of the invention.

Embodiments of the gas tap and cooking appliance are also disclosed in the following clauses.

Clause 1: A gas tap for a gas cooking appliance, comprising
  a body (10) comprising
    an inlet conduit (11) through which the gas is supplied, at least one gas outlet conduit (12, 13),
    and a housing (14) fluidically communicated with the inlet conduit (11) and with the outlet conduit (12, 13);
  a regulating element (2) arranged in the housing (14) of the body (10) and suitable for regulating the incoming gas flow from the inlet conduit (11) towards the outlet conduit (12, 13) depending on its angular position;
  a manually operable shaft (3) comprising a first end (30) coupled to the regulating element (2) and a second end (31) configured for being coupled to a knob that can be operated by a user, the shaft (3) being rotational between an initial angular position and a final angular position, and the shaft (3) comprising a first locking element (32); and
  a second locking element (50) arranged in the initial angular position,
  the shaft (3) being axially movable when it is arranged in the initial angular position between a first axial position in which the first locking element (32) and the second locking element (50) cooperate with one another, preventing the shaft (3) from being able to rotate and a second axial position in which the first locking element (32) is uncoupled from the second locking element (50) such that the shaft (3) is able to rotate, and
  the gas tap (1) comprising pushing means configured for pushing the shaft (3) towards the first axial position, the second end (31) of the shaft (3) is located further away from the body (10) when the shaft (3) is arranged in the second axial position than when the shaft (3) is arranged in the first axial position, such that the user has to pull on the shaft (3) in order to move it from the first axial position to the second axial position.

Clause 2: The gas tap according to clause 1, wherein the first locking element (32) is a radial prolongation of the shaft (3) and the second locking element (50) is a housing arranged in the initial angular position, such that when the shaft (3) is arranged in the initial angular position in the first axial position, the first locking element (32) is housed in the second locking element (50) such that the shaft (3) is unable to rotate, the first locking element (32) being dislodged of the second locking element (50) when it is arranged in the second axial position.

Clause 3: The gas tap according to clause 2, wherein the first locking element (32) is prolonged radially from the first end (30) of the shaft (3).

Clause 4: The gas tap according to either of clauses 2 or 3, comprising a supporting surface (51) after the second locking element (50), the first locking element (32) being supported on the supporting surface (51) when the shaft (3) is arranged between the initial angular position and the final angular position.

Clause 5: The gas tap according to clause 4, wherein the second locking element (50) is arranged in the first axial position and the supporting surface (51) is arranged in the second axial position.

Clause 6: The gas tap according to any of the preceding clauses, comprising a cover (4) fixed to the body (10) covering the housing (14) of the body (10), the cover (4) comprising a guide surface (40) configured for guiding the rotation of the first locking element (32) between the initial angular position and a final angular position.

Clause 7: The gas tap according to clause 6, wherein the pushing means comprise a spring (6) housed in the cover (4), a first end of the spring (6) being supported on a supporting surface (41) of the cover (4) and a second end of the spring supported on the base (35) of the shaft (3) which is arranged at the first end (30) thereof.

Clause 8: The gas tap according to clause 6 or 7, comprising a base (5) with a first part housed in the cover (4), the first part of the base (5) defining at least part of the second locking element (50), the base (5) comprising a second part (52) coupled to the body (10) of the gas tap (1).

Clause 9: The gas tap according to clause 8, wherein the first part of the base (5) comprises a notch (54) which defines at least part of the second locking element (50).

Clause 10: The gas tap according to clause 9, wherein the cover (4) comprises an axial stop element (42) partially housed in the notch (54) of the base (5), part of the notch (54) and part of the axial stop element (42) defining the second locking element (50).

Clause 11: The gas tap according to any of the preceding clauses, wherein the shaft (3) comprises a housing (34) in the proximity of the second end (31), the housing (34) being configured for receiving a fixing element for fixing the operable knob which is coupled to the second end (31), such that the knob is kept coupled to the shaft (3) when the user pulls the knob towards himself/herself to move the shaft (3) from the first axial position to the second axial position.

Clause 12: A gas cooking appliance that comprises at least one gas tap (1) according to any of the preceding clauses.

What is claimed is:

1. A gas tap for a gas cooking appliance, the gas tap comprising
  a body that includes an inlet conduit through which the gas is supplied, at least one gas outlet conduit, and a housing that is fluidically communicated with each of the inlet conduit and outlet conduit;
  a rotatable regulating element arranged in the housing of the body and configured to regulate gas flow from the inlet conduit towards the outlet conduit depending on an angular position of the rotatable regulating element;
  a manually operable shaft that includes a first end coupled to the rotatable regulating element such that when the manually operable shaft rotates so does the rotatable regulating element, the manually operable shaft having a second end configured to be coupled to a user operated knob, the manually operable shaft being rotational between an initial angular position and a final angular position, the manually operable shaft including a first locking element;

a second locking element configured to cooperate with the first locking element when the manually operable shaft is arranged in the initial angular position, the manually operable shaft being axially movable when arranged in the initial angular position between a first axial position in which the first locking element and the second locking element cooperate with one another, preventing the manually operable shaft from being able to rotate and a second axial position in which the first locking element is uncoupled from the second locking element such that the manually operable shaft is able to rotate, the second end of the manually operable shaft being located further away from the body when the manually operable shaft is arranged in the second axial position than when the manually operable shaft is arranged in the first axial position, such that a pulling on the manually operable shaft is required to move the manually operable shaft from the first axial position to the second axial position; and pushing means configured to continuously push the manually operable shaft towards the first axial position;

wherein the manually operable shaft includes a base located at or in proximity to the first end, the base having first and second surfaces, the first surface facing away from the rotatable regulating element, the second surface facing towards the rotatable regulating element, the pushing means comprising a first spring housed in a cover fixed to the body and covering the housing, the first spring having a first end supported on a supporting surface of the cover and a second end supported on the first surface of the base of the manually operable shaft, the gas tap further comprising a second spring having a first end that presses on a supporting surface of the rotatable regulating element and a second end that is supported on the second surface of the base of the manually operable shaft, a first force exerted by the first spring on the base of the manually operable shaft is opposite to a second force exerted by the second spring on the base of the manually operable shaft.

2. The gas tap according to claim 1, wherein the first locking element is a radial prolongation of the manually operable shaft and the second locking element is a groove arranged in the initial angular position, such that when the manually operable shaft is arranged in the initial angular position and in the first axial position, the first locking element is housed in the second locking element such that the manually operable shaft is unable to rotate, the first locking element being dislodged from the second locking element when the manually operable shaft is arranged in the second axial position.

3. The gas tap according to claim 2, comprising a supporting surface on which the first locking element is supported when the manually operable shaft is arranged between the initial angular position and the final angular position.

4. The gas tap according to claim 3, wherein the second locking element is arranged axially nearer the rotatable regulating element than the supporting surface.

5. The gas tap according to claim 1, further comprising a cover fixed to the body and covering the housing, the cover including a guide surface configured to guiding the rotation of the first locking element when the manually operable shaft rotates between the initial angular position and the final angular position.

6. The gas tap according to claim 5, wherein the pushing means comprise a spring housed in the cover, the spring having a first end supported on a supporting surface of the cover and a second end supported on the base of the manually operable shaft located at the first end of the manually operable shaft.

7. The gas tap according to claim 6, further comprising a second base with a first part housed in the cover, the first part of the second base defining at least part of the second locking element, the second base comprising a second part coupled to the body.

8. The gas tap according to claim 7, wherein the first part of the second base comprises a notch which defines at least part of the second locking element.

9. The gas tap according to claim 8, wherein the cover comprises an axial stop element partially housed in the notch, a part of the notch and a part of the axial stop element defining the second locking element.

10. The gas tap according to claim 1, wherein the manually operable shaft comprises a housing in a proximity of the second end that is configured to receive a fixing element for fixing the user operated knob to the manually operable shaft, such that the user operated knob is kept coupled to the manually operable shaft when the user operated knob is pulled to move the manually operable shaft from the first axial position to the second axial position.

11. The gas tap according to claim 1, wherein in the first force is greater than the second force.

12. The gas tap according to claim 1, wherein the first locking element is a groove arranged in the manually operable shaft and the second locking element is a protrusion of the gas tap.

13. A gas cooking appliance comprising the gas tap according to claim 1.

* * * * *